United States Patent [19]

Tattersall

[11] 4,103,755
[45] Aug. 1, 1978

[54] GAS-CUSHION VEHICLES

[75] Inventor: Edward Gunston Tattersall, Southhampton, England

[73] Assignee: Hovermarine Transport Limited, Southampton, England

[21] Appl. No.: 781,815

[22] Filed: Mar. 28, 1977

[30] Foreign Application Priority Data

Mar. 29, 1976 [GB] United Kingdom ............... 12489/76

[51] Int. Cl.² ............................................. B60V 1/11
[52] U.S. Cl. ..................................... 180/117; 180/120
[58] Field of Search ............... 180/116, 117, 118, 120, 180/126; 114/67 A

[56] References Cited

U.S. PATENT DOCUMENTS

| 3,040,668 | 6/1962 | Gram | 114/67 A |
| 3,050,146 | 8/1962 | Crim | 114/67 A |
| 3,854,547 | 12/1974 | Hall | 180/117 |
| 3,882,960 | 5/1975 | Wilson et al. | 180/118 |
| 3,946,689 | 3/1976 | Robbins et al. | 180/116 X |

Primary Examiner—Joseph F. Peters, Jr.
Assistant Examiner—Terrance L. Siemens
Attorney, Agent, or Firm—J. Rodman Steele, Jr.

[57] ABSTRACT

A gas-cushion vehicle is provided with one or more fans for supplying cushion air to the cushion space beneath the vehicle, and an additional, "passive" fan, the outflow of which varies according to changes in cushion pressure, whereby additional air is supplied to the cushion space as cushion pressure tends to decrease, and a backflow of cushion air takes place through the additional fan as cushion pressure tends to increase.

6 Claims, 2 Drawing Figures

GAS-CUSHION VEHICLES

BACKGROUND TO THE INVENTION

This invention relates to gas-cushion vehicles, that is to say, to vehicles for travelling over a surface and which, in operation, are supported above that surface, at least in part, by a cushion of pressurised gas, for example, air, formed and contained between the vehicle body and the surface.

When a gas-cushion vehicle travels over an undulating surface such as rough water or ground, it experiences changes in volume and thereby changes in pressure of the vehicle-supporting cushion, which changes result in the application of undesirable heave forces to the vehicle.

SUMMARY OF THE INVENTION

According to the present invention, a gas-cushion vehicle is provided with first means for supplying cushion gas to the cushion and second means, responsive to changes in cushion pressure, for supplying cushion gas to the cushion as cushion pressure tends to decrease, and for releasing cushion gas as cushion pressure tends to increase.

The said second means preferably comprises fan means. As used herein, the term "fan means" includes blowers or the like.

The fan means can be wholly or mainly centrifugal.

The invention may be applied to "sidewall" gas-cushion vehicles. That is to say, to gas-cushion vehicles for travelling over the surface of water, wherein, in operation, the sides of each of their vehicle-supporting cushions are contained by a pair of laterally-spaced "side" wall structures extending longitudinally along the sides of the vehicle body in substantially parallel array and depending therefrom so as to dip into the water and form a cushion-gas seal.

However, the invention may also be applied to other types of gas-cushion vehicles, for example, as described and claimed in our British Pat. No. 1,184,062, corresponding U.S. Pat. No. 3,559,608 (Tattersall).

BRIEF DESCRIPTION OF THE DRAWINGS

An embodiment of the invention will now be described by way of example, with reference to the accompanying drawings, wherein.

DESCRIPTION OF PREFERRED EMBODIMENT

Figure 1:
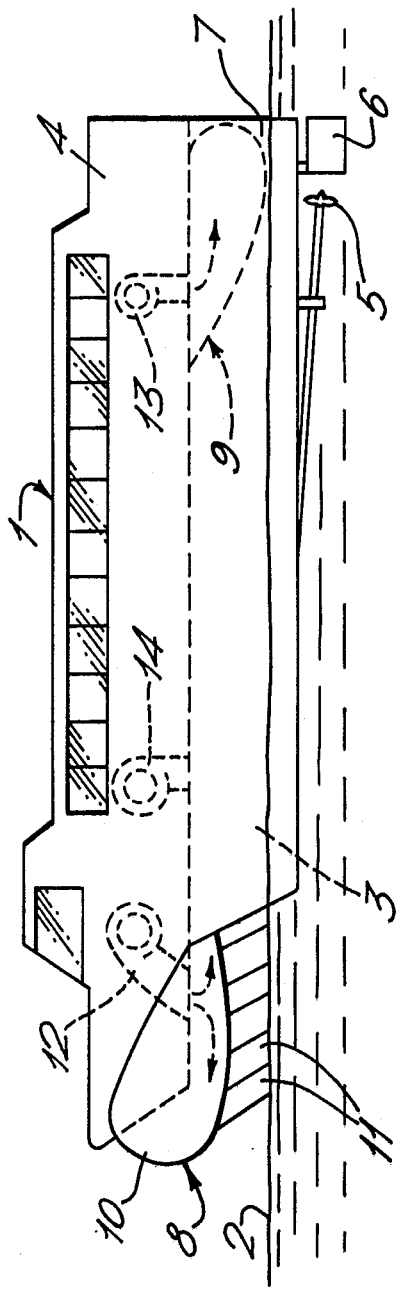
FIG. 1 is a side view of a sidewall gas-cushion vehicle.

With reference to FIG. 1, a sidewall gas-cushion vehicle 1 is shown travelling over the surface 2 of water, supported by a cushion 3 of pressurised gas (air), formed and contained between the vehicle body 4 and the surface 2. The vehicle 1 is propelled by a pair of water-screw propellers 5 and is steered by a pair of rudders 6.

The sides of the vehicle-supporting cushion 3 are contained by a pair of laterally-spaced sidewall structures 7 extending longitudinally along the sides of the vehicle body 4 in substantially parallel array. The sidewalls 7 depend from the sides of the vehicle body 4 so as to dip into the water and form a cushion seal. Each sidewall 7 carries a water-screw propeller 5 and a rudder 6.

The front or bow end of the cushion 3 is contained by a flexible skirt 8 and the rear or stern end thereof by a flexible skirt 9. The skirts 8, 9, which are of hollow, inflatable form, and constructed from rubberised fabric, extend laterally between (and in the case of the skirt 8, beyond as well) the front and rear ends of the sidewalls 7. The skirts 8, 9, are attached to the vehicle body 4 and depend therefrom. The flexible skirt 8 is in light contact with the water surface 2. The inflation and tension forces set up in the flexible skirt 9 ensure that it is maintained clear of but in close proximity to the surface 2.

The front flexible skirt 8 is of two-stage form and comprises an inflated bag 10 from which depend a succession of independently-deflectable flexible wall or skirt members 11 of the form disclosed by British Patent Specification No. 1,043,351 (corresponding to U.S. Pat. No. 3,420,330 of Bliss). Air forming the vehicle-supporting cushion 3 is provided by a pair of centrifugal fans 12 disposed side by side. Air from the fans 12 passes through the flexible skirt 8 to inflate it before entering the space occupied by the cushion 3. The rear flexible skirt 9 is inflated by air supplied by a centrifugal fan 13. The fans 12 and fan 13 form separate means for supplying air to the space occupied by the vehicle-supporting cushion 3 and the skirt 9 respectively.

In accordance with the invention, the vehicle 1 is provided with first means, (fans 12), for supplying cushion air to the cushion 3, and second (fan) means, comprising a centrifugal fan 14, operable independently of the fans 12, and responsive to changes in cushion pressure for supplying pressurised air to the cushion 3 as cushion pressure tends to decrease and for releasing cushion air as cushion pressure tends to increase.

The fans 12, 13 and 14 are all driven by separate, variable-speed motors (not shown), whereby the fans are operable independently of one another. The power requirement of the fan 14 is about 30% or less of the power requirements of the fans 12. All the fans have side-disposed atmospheric air intakes.

Under normal conditions, the fans 12 are operated so as to maintain the cushion 3, the fan 13 so as to maintain inflation of the flexible skirt 9, and the fan 14 whereby it causes little or no air to be supplied to the cushion 3. The fan 14 merely runs at a substantially constant r.p.m. so that it serves as a valve to check the escape of cushion air via the fan 14.

In operation, as the vehicle 1 travels over the water surface 2, should it meet rough water whereby the wave size is such that increases and decreases in cushion volume, resulting in corresponding increases and decreases in cushion pressure, the fan 14 will respond to said pressure changes in the following manner.

Should the volume of the cushion 3 tend to increase, cushion pressure will fall correspondingly. This fall in cushion pressure will allow the fan 14, without any significant change in its speed, to supply pressurised air to the cushion until cushion pressure returns to its formal level. On the other hand, should the volume of the cushion 3 tend to decrease, with a corresponding increase in cushion pressure, the substantially constant speed of the fan 14 will be unable to prevent the escape of air from the cushion 3 to the atmosphere, by way of the fan itself. This reverse or back flow will continue until cushion pressure returns to its former level.

The flow of air into or out of the cushion 3 tends to reduce heave-induced accelerations and thus tends to improve the "ride" qualities of the vehicle 1.

Figure 2:
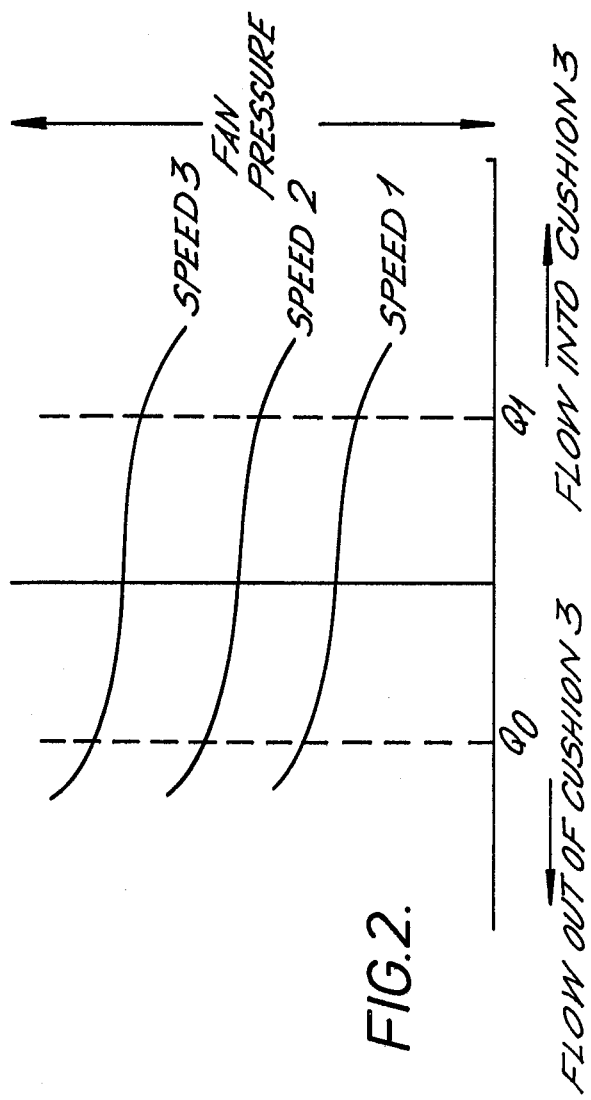
FIG. 2 is a fan pressure/flow graph.

With reference now to FIG. 2, the fan 14 contributes to the overall dynamic parameters of the cushion system. The slope of its pressure v. flow characteristic will affect the stiffness and damping of the system, so as to be analogous to spring rate and to a dash-pot respectively. Furthermore, its internal volume and blade geometry can be used so as to contribute to the damping of the system, whereby it is analogous to a piston moving in a perforated cylinder. Adjustment of the fan speed will not only affect the cut-off pressure but also will affect the stiffness and damping characteristics.

For small waves involving small, high-frequency excursions of pressure, a low damped system is beneficial in reducing response and for this purpose as large a fan 14 and fan inlet as is practical should be used so as to minimise losses of cushion air exhausting through the fan to atmosphere. The fan "valve" feature is operable over the relatively flat part of the fan characteristic between flow values $Q_1$ to $Q_0$, whereby a small increase in pressure is accompanied by a large increase in flow. The graph of FIG. 2 illustrates several different fan speeds, with speed 3 being the greatest.

For large waves of frequency near or below the natural frequency of the vehicle 1, in heave the desirable characteristic may require a high damping and in this case the r.p.m. of the fan 14 could be adjusted so as to bias the fan 14 whereby it discharges a significant flow of air into the cushion 3 in the mean (i.e. normal) operating condition. This discharge will also increase the stiffness and thereby increase the natural frequency of the system.

The motor driving the fan 14 may be controlled by a servo-mechanism sensitive to changes in cushion pressure, to heave acceleration of the vehicle, or to changes in the mean level of water surface 2, relative to a vertical datum on the vehicle. Such a control system would have a greater range of control than the passive system and would be more desirable when applied to larger low frequency excursions.

More than one fan 14 may be provided, for example, the fan means may comprise a pair of side-by-side disposed fans 14 driven by a single motor.

The cushion 3 may be divided longitudinally and/or transversely into cushion compartments. For example, by flexible skirt means. Each discrete cushion compartment may then be provided with its own fan 14 and associated driving motor. This modification allows pitch and/or roll-induced accelerations to be controlled.

The invention is not to be considered as confined to sidewall gas-cushion vehicles. It may also be applied, for example, to gas-cushion vehicles of the form disclosed by our British Pat. No. 1,184,062, (corresponding to U.S. Pat. No. 3,559,608 of Tattersall), to which reference should be made.

I claim:

1. A gas-cushion vehicle provided with first and second fan means operable independently of each other, said first fan means being operable so as to supply vehicle support gas to the cushion, and said second fan means being operable so as to be responsive to changes in cushion pressure, whereby said second fan means acts to supply gas to the cushion as cushion pressure tends to decrease, and to allow excess gas to be released by backflow as cushion pressure tends to increase.

2. A vehicle as claimed in claim 1, wherein both the first and second fan means comprise centrifugal fan means.

3. A vehicle as claimed in claim 1, wherein, in operation, the sides of the vehicle-supporting cushion are contained by a pair of laterally-spaced sidewall structures extending longitudinally along the sides of the vehicle body in substantially parallel array and depending therefrom so as to dip into the water and form a cushion-gas seal.

4. A vehicle as claimed in claim 1, wherein the second fan means has a power requirement up to 30% of that of said first fan means.

5. A gas-cushion vehicle provided with first and second fan means, said second fan means having atmospheric air inlet means and pressurized air outlet means connected to said cushion, said first fan means being operated so as to supply vehicle support air to the cushion and said second fan means being operated at a substantially constant speed, whereby with cushion pressure at its normal level substantially no air is supplied to said cushion by said second fan means, but said second fan means acts to supply air to the cushion should cushion pressure tend to decrease and to allow backflow of air to atmosphere should cushion pressure increase.

6. A gas-cushion vehicle as claimed in claim 5, wherein, in operation, the sides of the vehicle-supporting cushion are contained by a pair of laterally-spaced sidewall structures extending longitudinally along the sides of the vehicle body in substantially parallel array and depending therefrom so as to dip into the water and form a cushion air seal.

* * * * *